(12) United States Patent
Nanri et al.

(10) Patent No.: US 6,435,999 B1
(45) Date of Patent: Aug. 20, 2002

(54) CONTINUOUSLY VARIABLE TRANSMISSION AND METHOD OF CONTROLLING THE SAME

(75) Inventors: Takehiko Nanri; Yoshihiro Yoshida; Atsuo Ota, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,339

(22) Filed: Sep. 5, 2000

(30) Foreign Application Priority Data

Sep. 5, 1999 (JP) ............................................ 11-291421

(51) Int. Cl.[7] .............................................. F16H 47/04
(52) U.S. Cl. .............................. 475/76; 475/80; 477/52
(58) Field of Search ........................ 477/52, 68; 475/76, 475/80, 83

(56) References Cited

U.S. PATENT DOCUMENTS

| | | | | |
|---|---|---|---|---|
| 4,943,371 A | * | 7/1990 | Koyama et al. | ............... 74/865 |
| 5,417,623 A | * | 5/1995 | Ishikawa et al. | ............... 477/68 |
| 5,529,546 A | * | 6/1996 | Ishino et al. | ................... 475/76 |
| 6,292,730 B1 | * | 9/2001 | Takizawa et al. | ............. 701/51 |

FOREIGN PATENT DOCUMENTS

JP        A882354        3/1996

* cited by examiner

Primary Examiner—Rodney H. Bonck
Assistant Examiner—Eric M Williams
(74) Attorney, Agent, or Firm—Birch, Stewart, Kolasch & Birch, LLP

(57) ABSTRACT

A continuously variable hydrostatic transmission in which a fixed displacement hydraulic pump and a variable displacement hydraulic motor are disposed on a drive axle, and connected via a closed hydraulic circuit. The continuously variable hydrostatic transmission shifts gears by changing the inclination angle of a movable swashplate provided for the variable displacement the hydraulic motor. The continuously variable hydrostatic transmission may perform a correction control, where the movable swashplate is moved to the TOP side, and the maximum value of the shift amount is obtained. Then, the movable swashplate is moved to the LOW side, and the minimum value is obtained. By storing the maximum and minimum values, correction data is derived. After that, the TOP and LOW transmission gear ratios are determined on the basis of the correction data.

17 Claims, 7 Drawing Sheets

| GEAR | VEHICLE SPEED | ENGINE SPEED | INITIAL CONDITION |
|---|---|---|---|
| NEUTRAL | 0 | 0 | ON |
| VALUES OTHER THAN THE ABOVE ||| OFF |

CONTINUOUSLY VARIABLE TRANSMISSION AND METHOD OF CONTROLLING THE SAME

BACKGROUND OF THE INVENTION

1. Field of the Invention

The present invention relates to an automatic transmission to be mounted on a vehicle. More particularly, the present invention relates to a continuously variable hydrostatic transmission in which a swashplate type hydraulic pump of a fixed displacement and a swashplate type hydraulic motor of a variable displacement are connected via a hydraulic closed circuit. The present invention further relates to a method of controlling a movable swashplate of a transmission.

2. Background Art

A conventional continuously variable hydrostatic transmission is applied to a transmission of a motorcycle. Japanese Registered Patent No. 2527199 discloses a method of controlling a such continuously variable hydrostatic transmission by comparing a real rotational speed (hereinbelow referred to as "Ne"), based on a rotational speed Ne of a crank shaft or the like, with a target rotational speed Ne, determined by preset conditions by a controller, and adjusting an inclination angle of a moveable swashplate, thereby controlling an output.

Japanese Unexamined Patent Publication No. H8-82354 discloses a method of performing a step-by-step gear ratio control similar to that performed by a manual multi-stage transmission by a continuously variable transmission (hereinbelow, called stage transmission).

A transmission gear ratio in a conventional continuously variable transmission having a motor-driven changing mechanism is corrected by shifting a shift position to an extreme position in response to each shift-up (or shift-down) command, and using the value of a spindle angle at the time of the extreme position as a correction value. The correction is performed sequentially when a shift command is generated (hereinbelow referred to as "sequential correction"). With respect to correction of the angle of a swashplate of a continuously variable hydrostatic transmission, when a vehicle is stopped, the swashplate of the continuously variable hydrostatic transmission is on a maximum deceleration position (LOW ratio) side. Consequently, the swashplate does not reach a minimum deceleration position ratio (TOP ratio) depending on a driving state after the vehicle starts, and the angle of the swashplate is not corrected.

In the case where the correction is not performed, the value of the ratio of the continuously variable hydrostatic transmission becomes unclear. In the case of using a continuously variable hydrostatic transmission system as a stage transmission, the gear ratio before correction and that after the correction are different from one another. Consequently, it is difficult to perform accurate sequential correction.

SUMMARY OF THE INVENTION

In light of the shortcomings of the conventional art, it is an object of the invention to accurately correct the gear ratio in a continuously variable transmission.

According to a first aspect of the invention, a continuously variable transmission is provided which determines either a target engine speed or a target gear ratio on the basis of a throttle angle, a vehicle speed, and an engine speed. The continuously variable transmission further controls a gear ratio of the continuously variable transmission on the basis of the target engine speed or the target gear ratio. A storage device is provided for storing a minimum shift position and a maximum shift position of a transmission control member of the continuously variable transmission.

According to the first aspect of the invention, when a correcting operation of storing the positions is performed once before driving, the gear ratio is therefore corrected on the basis of the position information. This renders a correcting operation after driving unnecessary, and the correction of the gear ratio in a continuously variable transmission is thereby facilitated.

According to a second aspect of the invention, a maximum deceleration position and a minimum deceleration position of a continuously variable transmission are determined on the basis of prestored minimum and maximum shift position data of the transmission control member of the continuously variable transmission.

According to the second aspect of the invention, the maximum deceleration position (LOW ratio) and the minimum deceleration position (TOP ratio) of a continuously variable transmission can be determined on the basis of the correction data. Consequently, unlike a conventional technique, a member in addition to the continuously variable transmission for, for example, measuring a spindle angle of an electric changing mechanism, is not required. This eases the correcting control, and the control of correcting the gear ratio in a continuously variable transmission is facilitated.

According to a third aspect of the invention, a transmission control method of a continuously variable transmission switches the continuously variable transmission to a shift position in stages. The gear ratio corresponding to a shift position in stages on the basis of gear ratio data corresponding to prestored maximum deceleration position and minimum deceleration position of the continuously variable transmission.

According to the third aspect of the invention, the gear ratio of each stage in the case of shifting a gear in stages can be determined based on the correction data, so that the gear shift in stages in a continuously variable transmission can be performed accurately and easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
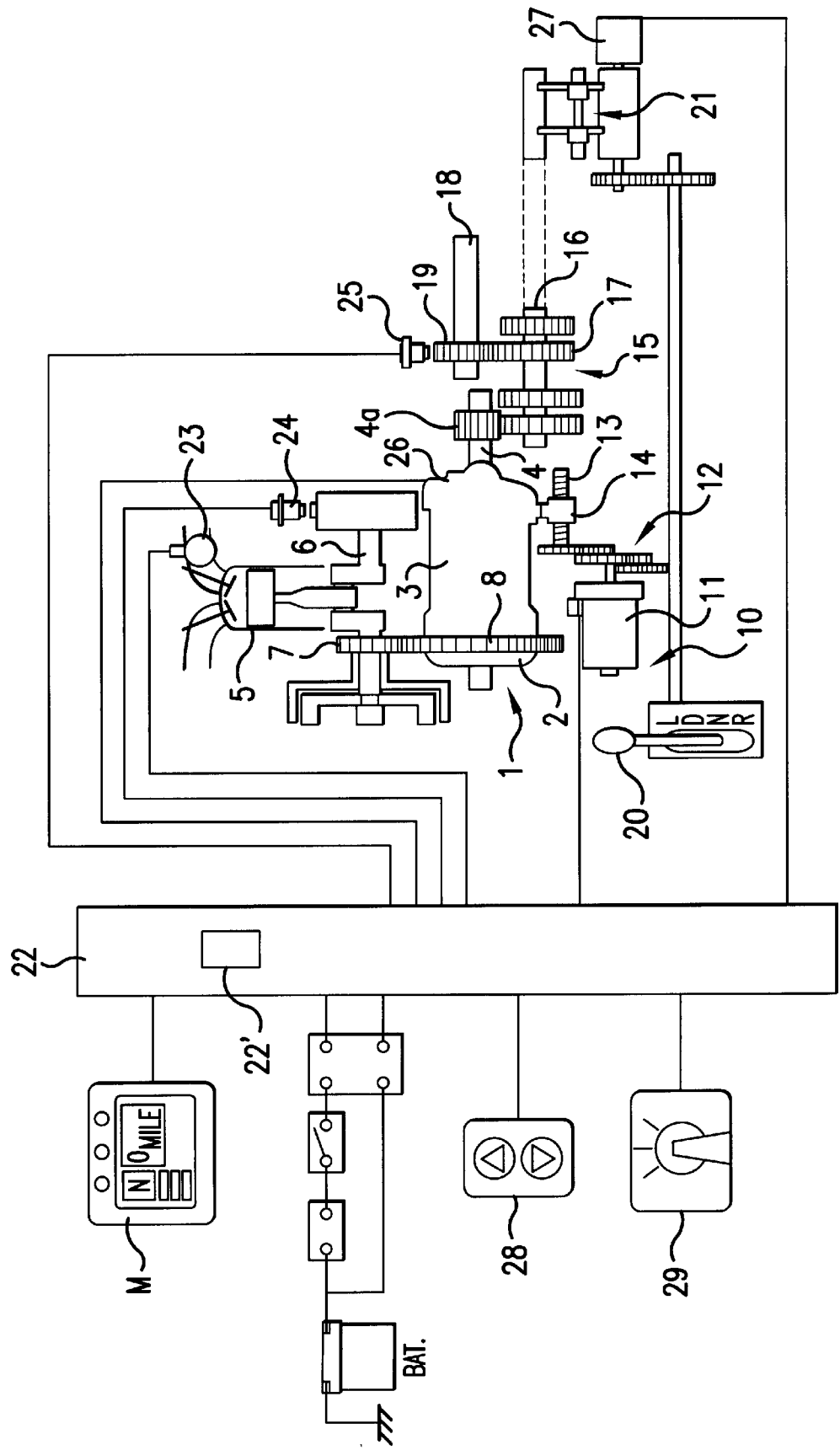
FIG. 1 is a control system diagram of a continuously variable hydrostatic transmission according to one embodiment of the present invention.

FIG. 1 is a control system diagram of a continuously variable hydrostatic transmission. With reference to FIG. 1, the control of a continuously variable hydrostatic transmission will be explained. In a continuously variable hydrostatic transmission 1, a fixed displacement hydraulic pump 2 and a variable displacement hydraulic motor 3 are integrated on a drive axle 4 and connected via a hydraulic closed circuit. By rotating a driven gear 8 of the fixed displacement hydraulic pump 2 by a driving gear 7 provided for a crank shaft 6 of an engine 5, power is converted to a rotational force which is outputted to the drive axle 4. At this time, by changing the inclination angle of a movable swashplate (which will be described later) provided in the variable displacement hydraulic motor 3 by an inclination angle control mechanism 10, the gear ratio can be changed.

The inclination angle control mechanism 10 transmits the output of a control motor 11 to a reduction gear 12 to change the inclination angle of the movable swashplate provided in the variable displacement hydraulic motor 3 via a ball screw 13 and a slider 14. A transmission output of the continuously variable hydrostatic transmission 1 is transmitted from an output gear 4a of the drive axle 4 to a secondary reducer 15. The transmission output of the secondary reducer 15 is transmitted from an output gear 17 on a transmission output shaft 16 to a final output gear 19 on a final output shaft 18.

The secondary reducer 15 is shifted by driving a shifter 21 by manually operating a shift lever 20 to switch the setting of the shift position of forward side L or D, rearward R and neutral N. On the forward side, the shift positions of L and D are continuously variably shifted. The shift is made by the inclination angle control.

The inclination angle control is performed by controlling the control motor 11 of the inclination angle control mechanism 10 by a controller 22. Controller 22 includes an EEPROM storage means 22. The controller 22 receives, as signals for the inclination angle control mechanism 10, a throttle angle from a throttle sensor 23 provided on the intake side of the engine 5, real rotational speed Ne from a rotation sensor 24 provided in proximity to the crank shaft 6, a vehicle speed from a speed sensor 25 provided in proximity to the final output gear 19, a swashplate angle from an angle sensor 26 provided for the variable displacement hydraulic motor 3, and a shift position from a shift sensor 27 provided for the shifter 21.

Further, the controller 22 obtains signals also from a shift switch 28 provided for a steering wheel and a mode map switch 29. A display signal for an indicator is outputted to an instrument panel M and power is supplied from a vehicle-mounted battery.

Figure 2:
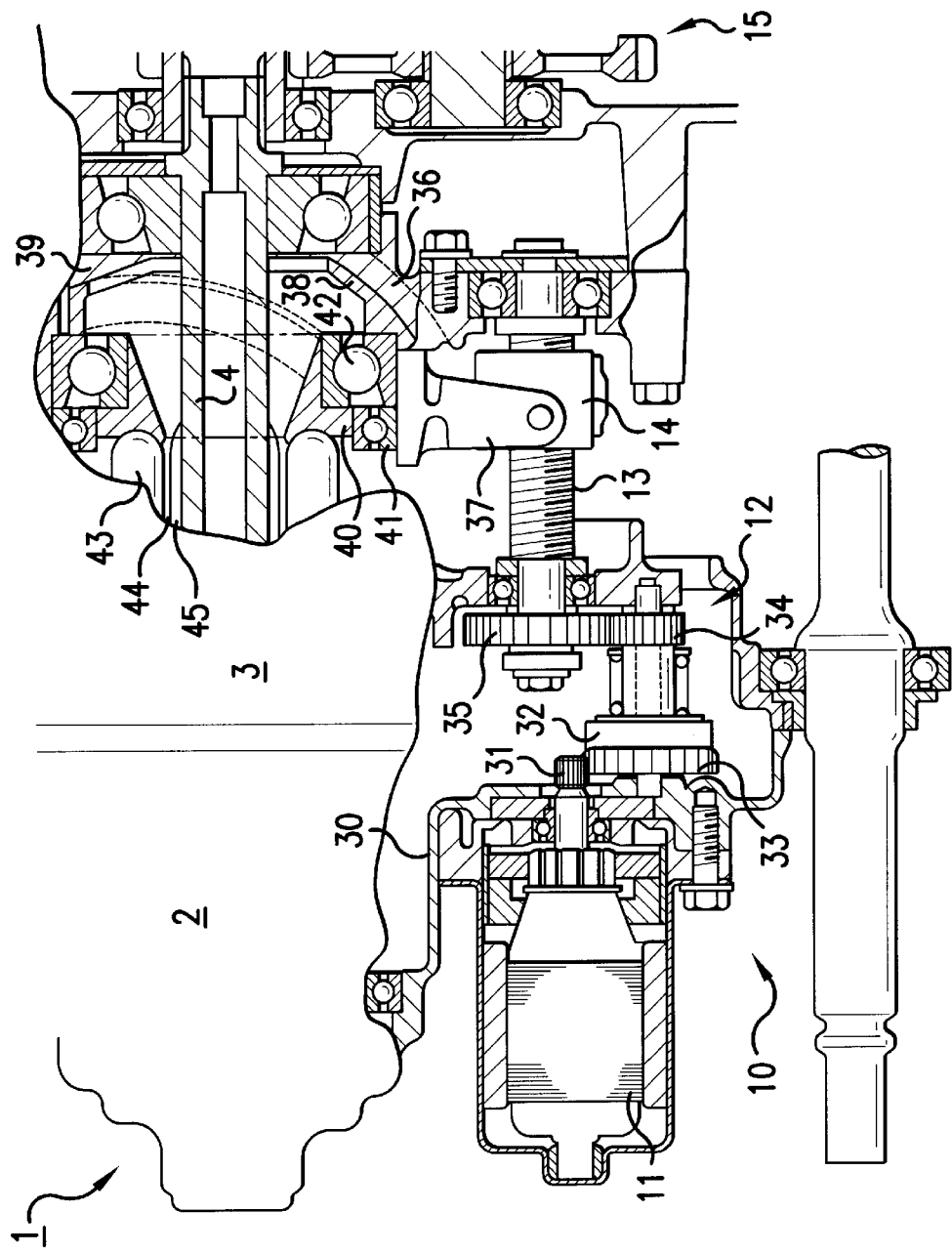
FIG. 2 is a view of an inclination angle control mechanism according to one embodiment of the present invention.

The inclination angle control mechanism 10 will now be described with reference to FIG. 2. The control motor 11 in the inclination angle control mechanism 10 is supported by a housing 30 of the fixed displacement hydraulic pump 2. An output gear 31 is transmitted via an input gear 33 of a torque limiter 32 from a gear 34 to a ball screw driving gear 35. The ball screw driving gear 35 rotates integrally with the ball screw 13. When the ball screw 13 rotates in forward or reverse, the slider 14 in which a nut is formed moves accordingly along the shaft. Both ends of the ball screw 13 are supported by a housing 36 of the hydraulic motor 3.

One end of an arm 37 which protrudes to the outside from the housing 36 of the variable displacement hydraulic motor 3 is rotatably attached to the slider 14. The other end of the arm 37 is integrally formed with a swashplate holder 38 supported within the housing 36. Since the swashplate holder 38 is supported so as to be swingable onto a concave curve 39 formed in the housing 36, when the arm 37 swings, the swashplate holder 38 integrally swings along the concave curve 39 and its angle is therefore changed.

A movable swashplate 40 is tunably held in the swashplate holder 38 via bearings 41 and 42. By a change in the angle of the swashplate holder 38, the inclination angle as an angle formed by the rotation face of the movable swashplate 40 and the axial line of the drive axle 4 is changed. FIG. 2 shows a TOP state where the angle is 90 and the gear ratio is 1.0.

A hydraulic plunger 43 of the variable displacement hydraulic motor 3 is pressed against the movable swashplate 40. A plurality of hydraulic plungers 43 are provided in the circumferential direction of a drum-shaped rotor 44 and pushed so as to protrude to the movable swashplate 40 side by the hydraulic pressure of the fixed displacement hydraulic pump 2. A rotational force is applied to the rotor 44 in accordance with the inclination angle of the movable swashplate 40. The outer periphery of the rotor 44 is spline coupled 45 to the drive axle 4. The drive axle 4 is rotated by the rotation of the rotor 44.

Figure 3:
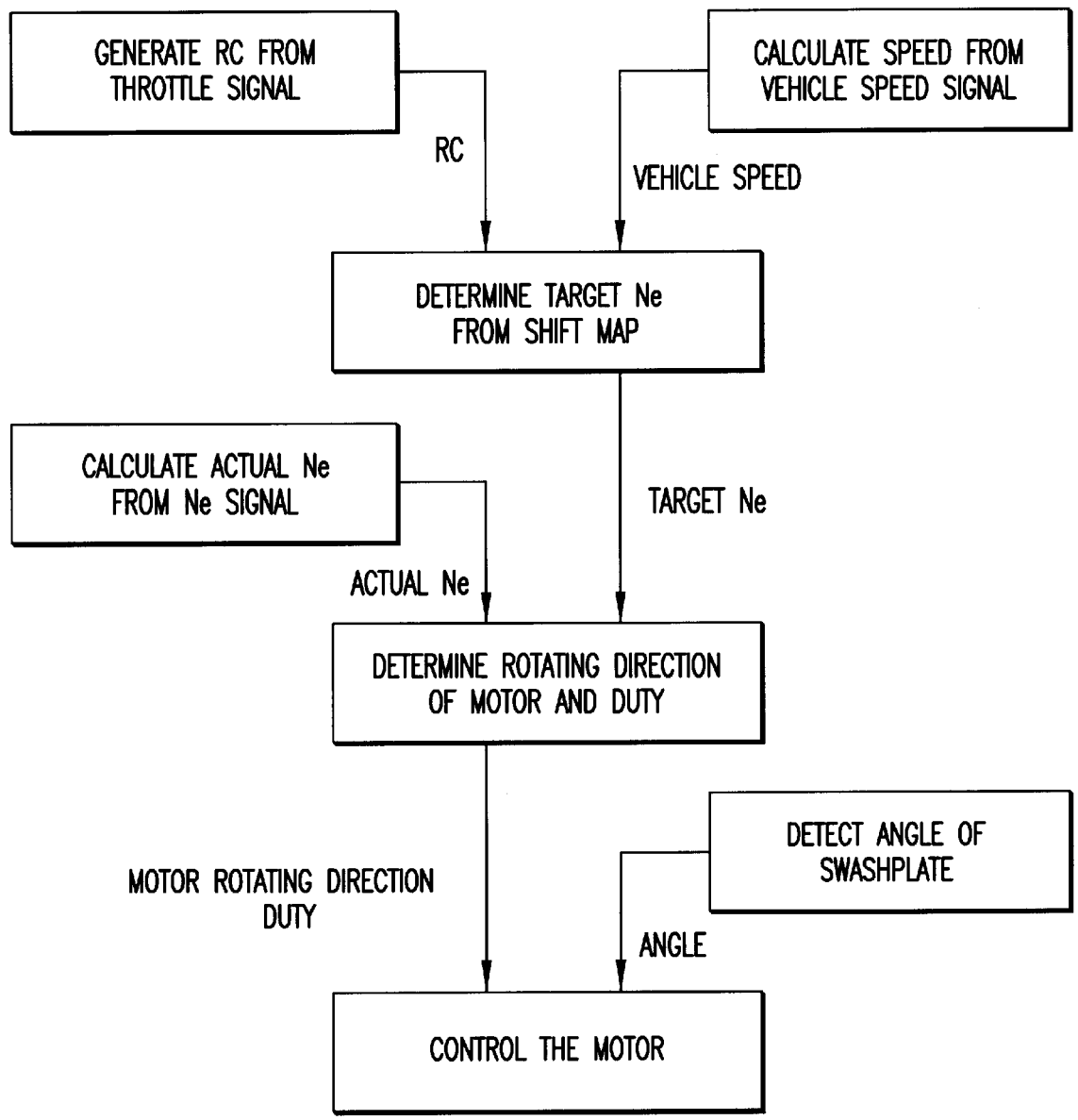
FIG. 3 is a flowchart showing a method for inclination angle control according to one embodiment of the present invention.

A transmission control at the time of continuously variable transmission in the controller 22 will now be described with reference to FIG. 3. First, an RC (running condition) is generated from the throttle signal transmitted from the throttle sensor 23. The running condition RC denotes a value which increases or decreases in accordance with the value of the throttle signal and may have the following general relation:

When the throttle is opened, RC increases.

When the throttle is closed, RC decreases.

Figure 4:
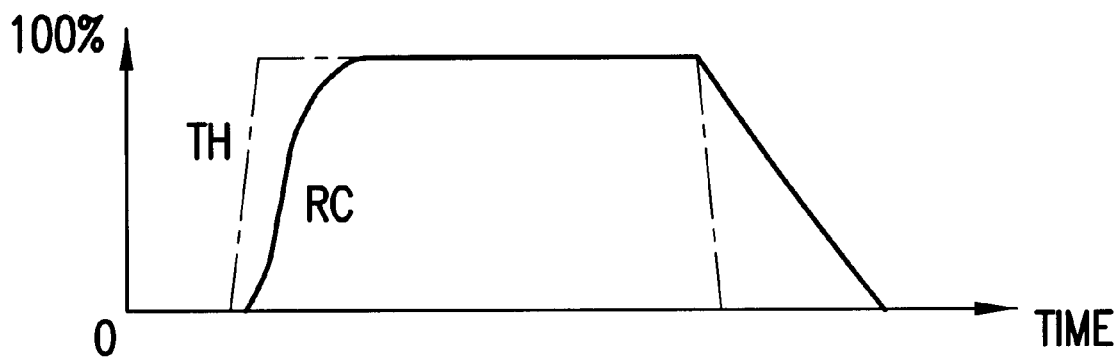
FIG. 4 illustrates a method of determining a running condition according to one embodiment of the present invention.

The relation is shown in FIG. 4. TH in the chart denotes throttle angle (%), the vertical line denotes the throttle angle TH and running condition RC (each in %) and the lateral line denotes time. Separately, vehicle speed is calculated from a vehicle speed signal transmitted from the angle sensor 26.

Figure 5:
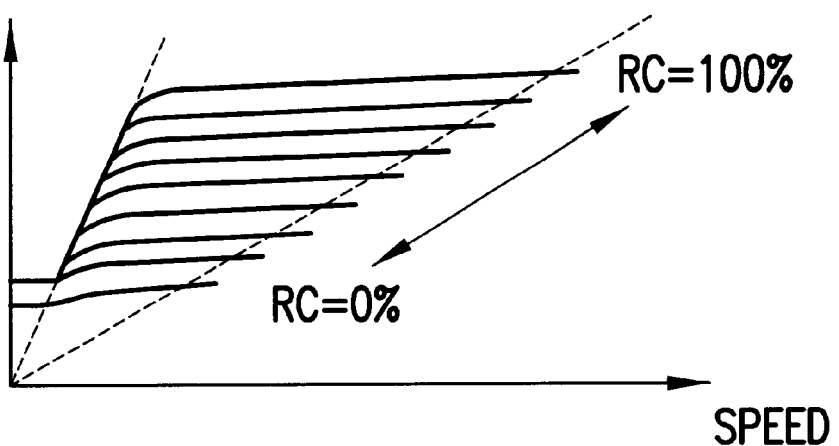
FIG. 5 illustrates a shift map according to one embodiment of the present invention.

Subsequently, on the basis of the running condition RC and the vehicle speed, a target rotational speed Ne is determined by referring to a shift map which is stored in the controller 22. An example of the shift map is shown in FIG. 5. A plurality of kinds of shift maps are prepared. For example, the shift maps dedicated for various modes such as an L-range mode, a sports mode, and a utility mode are provided and can be selected by the mode map switch 29.

Actual rotational speed Ne is calculated from the Ne signal sent from the rotation sensor 24. The actual rotational speed Ne is compared with the target rotational speed Ne, thereby determining the direction of either forward or reverse rotation of the control motor 11 and the duty.

Specifically, the direction of the movable swashplate may be determined as follows:

(1) When actual Ne>target Ne, the movable swashplate is moved to the TOP side.

(2) When actual Ne<target Ne, the movable swashplate is moved to the LOW side.

Further, the duty may be determined by the following equation:

$$DUTY = K1 \times |\text{actual Ne} - \text{target Ne}|,$$

wherein K1 is a coefficient.

The duty indicates the ratio of a current passed to the control motor 11, and is used to control the speed of the control motor 11. When the duty is 100%, the speed of the control motor 11 is the maximum. When the duty is 0%, the control motor 11 is stopped.

After that, on the basis of the angle of the swashplate calculated based on the motor rotating direction, the duty and the angle signal from the angle sensor 26, the control motor 11 is controlled. Specifically, the control motor 11 is driven on the basis of the motor rotating direction and the duty. The LOW and TOP ratios are measured from the angle of the swashplate. When the value is out of the TOP ratio, the control motor 11 is stopped.

In the embodiment, a stage transmission control can be realized. The stage transmission control denotes a transmission control capable of changing the gear ratio in a continuously variable transmission as if it is performed under a manual multi-stage transmission. Such a stage transmission control is performed by controlling the inclination angle of the movable swashplate 40 under the control of the controller 22 in a manner similar to the case described above. At this time, it is sufficient to change the manner of the control so as to be executed in stages.

The stage transmission control and the continuously variable transmission are shifted by pressing the shift switch 28. The shift switch 28 has a shift-up button and a shift-down button. By depressing one of the buttons, the stage is shifted up or down.

Figure 6:
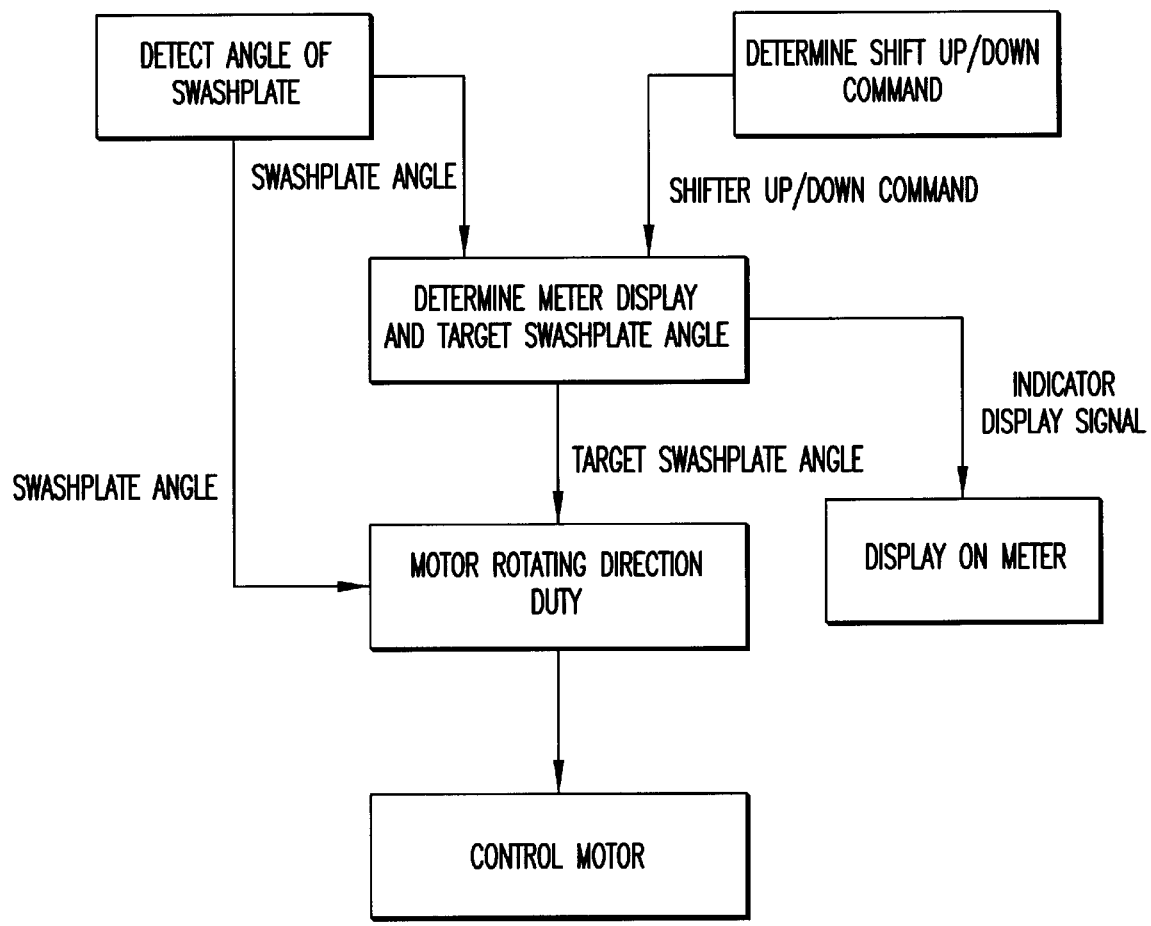
FIG. 6 is a flowchart showing a method for control in stages according to one embodiment of the present invention.

FIG. 6 shows the procedure in the controller 22 in the staged transmission control. First, an inclination angle is calculated from a swashplate angle signal from the angle sensor 26. In response to a shift signal sent from the shift switch 28, a shift command of shift-up or shift-down may be determined as follows:

(1) When the shift-up button in the shift switch 28 is pressed, the shift-up command is outputted.

(2) When the shift-down button is depressed, the shift-down command is outputted.

On the basis of the inclination angle and the shift command, the meter display is determined and the target swashplate angle is determined. The gear position corresponding to the shift lever position in the manual transmission is determined according to the inclination angle, a display signal to an indicator of a meter M is determined and outputted to the meter M, and the determined gear position is displayed on the meter M.

The target swashplate angle may be determined from the following conditions based on a present gear display signal when a shift command is inputted:

(1) In the case of the shift-up command, shift-up is performed by one.

(2) In the case of the shift-down command, shift-down is performed by one.

Subsequently, by comparing the target swashplate angle determined as described above with the inclination angle, the forward or reverse rotation direction of the control motor 11 and the duty may be determined as follows:

(1) When inclination angle>target swashplate angle, the movable swashplate 40 is moved to the LOW side.

(2) When inclination angle<target swashplate angle, the movable swashplate 40 is moved to the TOP side.

The duty may be determined by the following equation:

$$Duty = K2 \times |\text{inclination angle} - \text{target swashplate angle}|,$$

where K2 is a coefficient.

After that, on the basis of the motor rotating direction and the duty, the control motor 11 is controlled to incline the movable swashplate 40 at a predetermined angle. In such a manner, the continuously variable hydrostatic transmission 1 can perform the stage transmission corresponding to the state transmission of a manual multi-stage transmission.

A correction control will now be described. The controller 22 has a correction control function. Consequently, two modes of a regular control mode and a correction control mode can be selected. The mode may be switched to the correction control mode, for example, only when the shift switch 28 is operated in a predetermined manner. The regular mode denotes a transmission control by the continuously variable hydrostatic transmission 1 including both the continuously variable control and the control in stages.

Figures 7, 8:
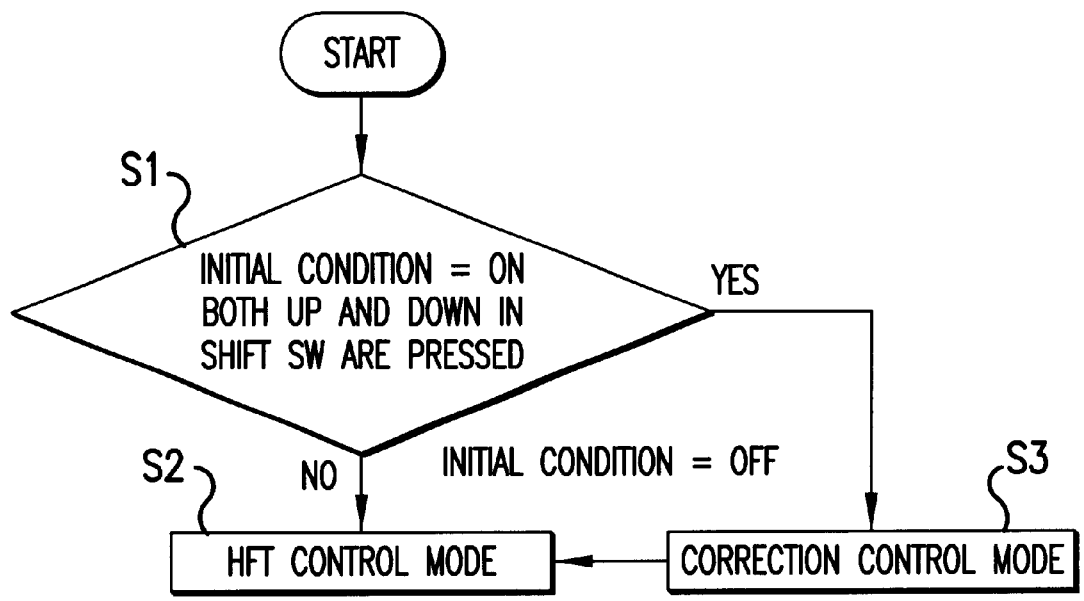
FIG. 7 is a diagram illustrating a method of determining an initial condition according to one embodiment of the present invention.
FIG. 8 is a flowchart showing a control mode determining method according to one embodiment of the present invention.

FIG. 7 illustrates a method of determining the initial condition in the mode determination. When the controller 22 is turned on by turning on the power, the initial condition is determined on the basis of the shift position, vehicle speed and engine rotational speed Ne. Only when the gear shift position is N, the vehicle speed is 0, and the engine rotational speed Ne is 0, is the initial condition ON. In all other cases, the initial condition is OFF.

FIG. 8 illustrates a control mode determining method. First, (S1), a determination is made as to whether the initial condition is ON, and whether both buttons of the shift switch 28 (shown as shift SW) are simultaneously pressed or not. If NO, the regular control mode is determined (S2). If YES, the correction control mode is determined (S3). Even if the correction control mode is set once, when the initial condition becomes OFF, the correction control mode is switched to the regular control mode.

Figure 9:
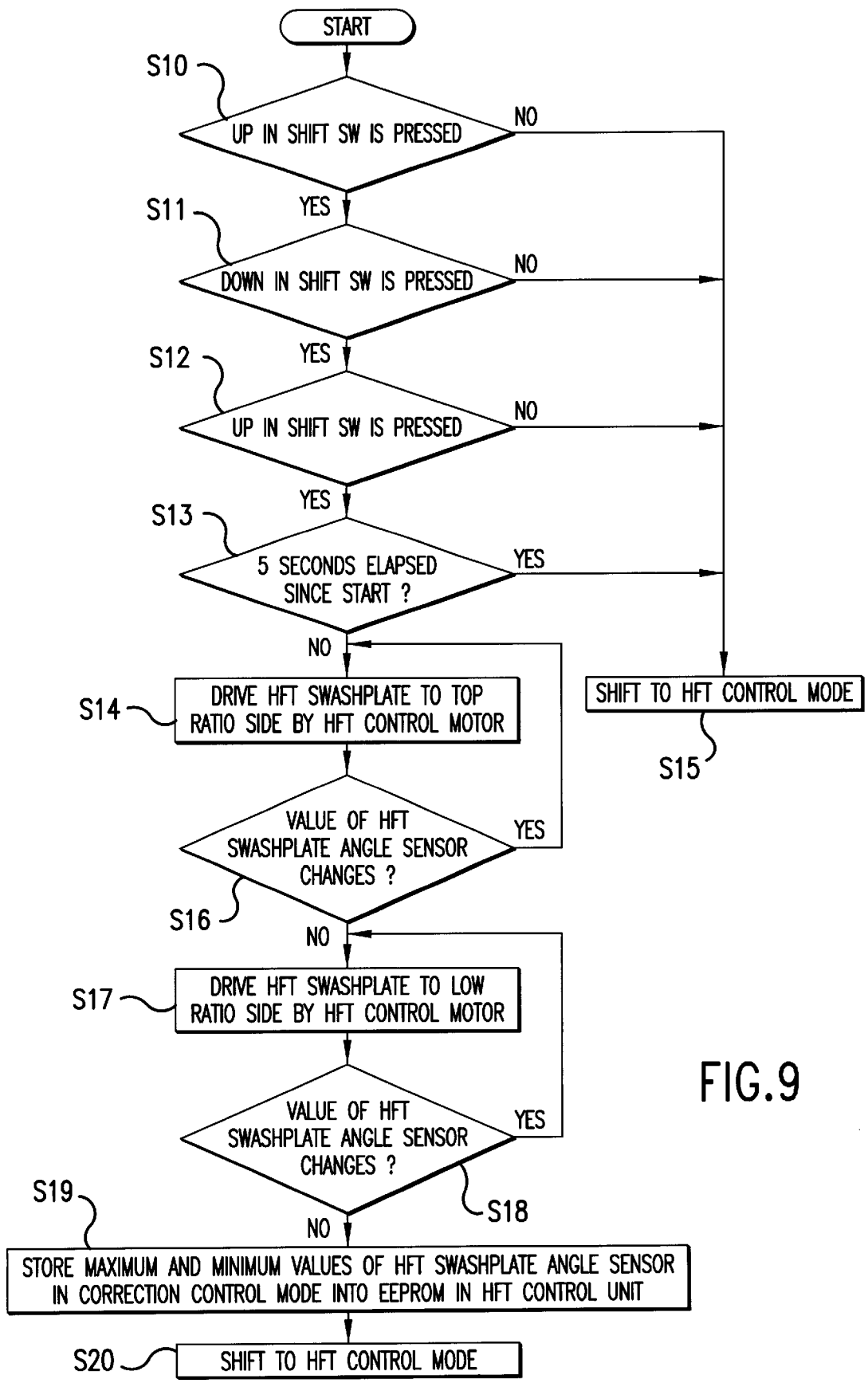
FIG. 9 is a flowchart showing a correction control method according to one embodiment of the present invention.

In FIGS. 8 and 9, HFT is an abbreviation of the continuously variable hydrostatic transmission 1.

FIG. 9 shows a correction control method of one embodiment of the present invention. Once the controller 22 enters the correction control mode, first a determination is made as to whether there is a correction start command or not. In the embodiment, the correction start command is generated by pressing the buttons of the shift switch 28 in the order of the shift-up button, the shift-down button and the shift-up button, within 5 seconds after the start. That is, in step (S10) a determination is made as to whether the shift-up button of the shift switch 28 (described as shift SW) is pressed or not. If YES, a determination is made as to whether the down-button is pressed or not (S11). If YES, further, a determination is made as to whether the up-button is pressed or not (S12). If YES, a determination is then made as to whether elapsed time since the start of the correction control is within 5 seconds or not (S13).

When all of the steps (S10–S13) are YES, the control motor 11 is driven to move the movable swashplate 40 to the TOP side (S14). When the state that all of them are YES is not obtained, it is determined that there is no correction start command and the mode is switched to the regular control mode (S15).

Subsequent to step S14, the value of the angle sensor 26 is checked (S16). When the value changes, it is regarded that the movable swashplate 40 has not yet reached the TOP side, so that the driving is continued. When there is no change in the value of the angle sensor 26, it denotes that the movable swashplate 40 has reached the TOP side. The control motor 11 is rotated reversely to drive the movable swashplate 40 to the LOW side (S17).

After that, the value of the angle sensor 26 is checked (S18). When the value changes, it is regarded that the movable swashplate 40 has not reached the LOW side, so that the driving is continued. When there is no change, it denotes that the movable swashplate 40 has reached the LOW side. Consequently, the maximum and minimum values of the angle sensor 26 in the correction control are stored in the storage device. The storage device may comprise, for example, all or part of an EEPROM 22' in the controller 22 (S19), or another type of electronic storage. After that, the mode is switched to the regular control mode (S20).

The correction is made in a state where the vehicle is stopped before driving (at the time of shipping from a factory line). It is sufficient that the controller 22 recognizes the correcting operation by the operation of the shift switch 28, and stores in EEPROM 22' the minimum and maximum values of the angle sensor 26 obtained when the angle of the swashplate is changed by the control motor 11 from the TOP side to the LOW side. As described above, by performing the correction before the vehicle is driven, the accuracy of detecting the angle of the swashplate is improved. What is more, by using the shift switch 28 for the operation of starting the correcting operation, it is not necessary to provide an additional switch. Further, by installing the torque limiter 32 to the drive shaft of the control motor 11 transmission motor, an occurrence of an excessive torque at the time of determining the TOP or LOW side and an occurrence of a motor lock current can be suppressed.

The present invention can be applied not only to a continuously variable hydrostatic transmission system, but also to improve the position detecting accuracy of a CTV system, an electronic controlled belt conveyer or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuously variable transmission for a vehicle, the transmission comprising:
   a driving gear engageable with an engine;
   a transmission control device driveable by the driving gear;
   an output shaft driveable by the transmission control device;
   a controller for controlling the transmission control device, the controller including a storage device for storing a first shift position and a second shift position of the transmission control device;
   a rotation sensor for detecting a speed of the engine; and
   an angle sensor for detecting a position of a swashplate within the transmission control device, the rotation sensor and the angle sensor being in communication with the controller so that the controller can utilize speed data from the rotation sensor and position data from the angle sensor to control the transmission control device.

2. The transmission of claim 1, wherein the transmission control device includes a pivotable swashplate, the first and second shift positions being determined on the basis of a minimum and a maximum angular displacement of the swashplate.

3. The transmission of claim 1, wherein a minimum deceleration position and a maximum deceleration position of the continuously variable transmission are determined on the basis of the first and second shift positions.

4. The transmission of claim 1, wherein the transmission control device includes:
   an inclination angle control mechanism;
   a swashplate operatively connected to and pivotable by the inclination angle control mechanism; and
   a drive axle operatively connected to the output shaft and capable of exerting a variable output force depending upon a position of the swashplate.

5. The transmission of claim 4, wherein the transmission control device includes a hydraulic motor, the hydraulic motor being engaged with the driving gear through a driven gear, and the swashplate being disposed within the hydraulic motor.

6. The transmission of claim 4, wherein the transmission control device includes a reducing gear disposed between and operatively connecting the drive axle and the output shaft.

7. The transmission of claim 4, wherein a minimum deceleration position and a maximum deceleration position of the continuously variable transmission are determined on the basis of the first and second shift positions.

8. The transmission of claim 1, wherein the storage device includes an electronic memory.

9. The transmission of claim 1, further comprising:
   a vehicle speed sensor for detecting a speed of the vehicle; and
   a throttle sensor for detecting a throttle angle of the engine.

10. The transmission of claim 9, wherein the controller can determine either a target engine speed or a target gear ratio on the basis of a detected throttle angle, a detected vehicle speed, and a detected engine speed.

11. The transmission of claim 1, wherein the transmission is operable in low gear, drive, neutral, and reverse.

12. A continuously variable transmission capable of determining either a target engine speed or a target gear ratio on the basis of a throttle angle, a vehicle speed, and an engine speed, and controlling a gear ratio of the continuously variable transmission on the basis of the target engine speed or the target gear ratio, the continuously variable transmission comprising:
   a storage device for storing a minimum shift position and a maximum shift position of a transmission control member of the continuously variable transmissions;
   a rotation sensor for detecting a speed of the engine; and
   an angle sensor for detecting a position of a swashplate within the transmission control device, the rotation sensor and the angle sensor being in communication with the controller so that the controller can utilize speed data from the rotation sensor and position data from the angle sensor to control the transmission control device.

13. The continuously variable transmission of claim 12, wherein a maximum deceleration position and a minimum deceleration position of the continuously variable transmission are determined on the basis of prestored minimum and maximum shift position data of the transmission control member.

14. A transmission control method for a continuously variable transmission comprising the steps of:
   detecting a first position of a transmission control member;
   detecting a second position of a transmission control member;
      wherein the transmission control member is a swashplate, the step of detecting a first position includes detecting a minimum angular displacement of the swashplate, and the step of detecting a second position includes detecting a maximum angular displacement of the swashplate;
   storing the first and second positions in a storage device; and
   establishing a first deceleration position and a second deceleration position based on the stored first and second positions.

15. The transmission control method of claim 14, further comprising:
   detecting an engine speed;
   detecting a vehicle speed;
   detecting an engine throttle angle; and
   detecting either a target engine speed or a target gear ratio based at least on the detected engine speed, vehicle speed, and engine throttle angle.

16. The transmission control method of claim 15, further comprising:
   moving the transmission to a shift position in stages.

17. The transmission control method of claim 14, wherein the first deceleration position is a minimum deceleration position and the second deceleration position is a maximum deceleration position.

* * * * *